United States Patent [19]

Kakabaker

[11] Patent Number: 4,721,311
[45] Date of Patent: Jan. 26, 1988

[54] MECHANICAL SEAL ASSEMBLY WITH COOLANT CIRCULATION TUBE

[75] Inventor: Kenneth G. Kakabaker, Kalamazoo, Mich.

[73] Assignee: Durametallic Corporation, Kalamazoo, Mich.

[21] Appl. No.: 48,502

[22] Filed: May 5, 1987

Related U.S. Application Data

[63] Continuation of Ser. No. 928,506, Nov. 7, 1986, abandoned.

[51] Int. Cl.4 .............................................. F16J 15/38
[52] U.S. Cl. ....................................... 277/22; 277/15; 277/17; 277/72 R; 277/79
[58] Field of Search ................................... 277/15-22, 277/59, 71, 72 R, 72 FM, 74, 79

[56] References Cited

U.S. PATENT DOCUMENTS

| | | | |
|---|---|---|---|
| 2,531,079 | 11/1950 | Payne | 277/16 |
| 2,628,852 | 2/1953 | Voytech | 277/22 X |
| 3,117,792 | 1/1964 | Glenn et al. | 277/22 |
| 3,477,729 | 11/1969 | Hershey | 277/15 X |
| 4,114,899 | 9/1978 | Kulzer et al. | 277/22 |

Primary Examiner—Robert S. Ward
Attorney, Agent, or Firm—Flynn, Thiel, Boutell & Tanis

[57] ABSTRACT

A mechanical seal assembly provided with an annular seal cavity which encircles the seal parts. A coolant circulation tube (i.e., an exit tube) projects through the housing into the seal cavity and is provided with a window-shaped opening in the sidewall thereof opposing the direction of coolant circulation. The lower end of the tube is preferably closed off by a bottom wall which is inclined outwardly away from the rotating seal parts in the direction of fluid circulation. This bottom wall has a lower edge defining the lower edge of the window and disposed closely adjacent the periphery of the rotating seal parts. The substantial quantity of circulating coolant, and the substantial velocity head thereof, passes through the window into the inner end of the tube so that the velocity head is converted into a significant static pressure head, whereupon the liquid is pumped radially outwardly of the tube through a closed circuit having a heat exchanger associated therewith. This circuit at its other end connects to an inlet hole which communicates with the seal cavity at a location which is circumferentially spaced from the tube.

12 Claims, 9 Drawing Figures

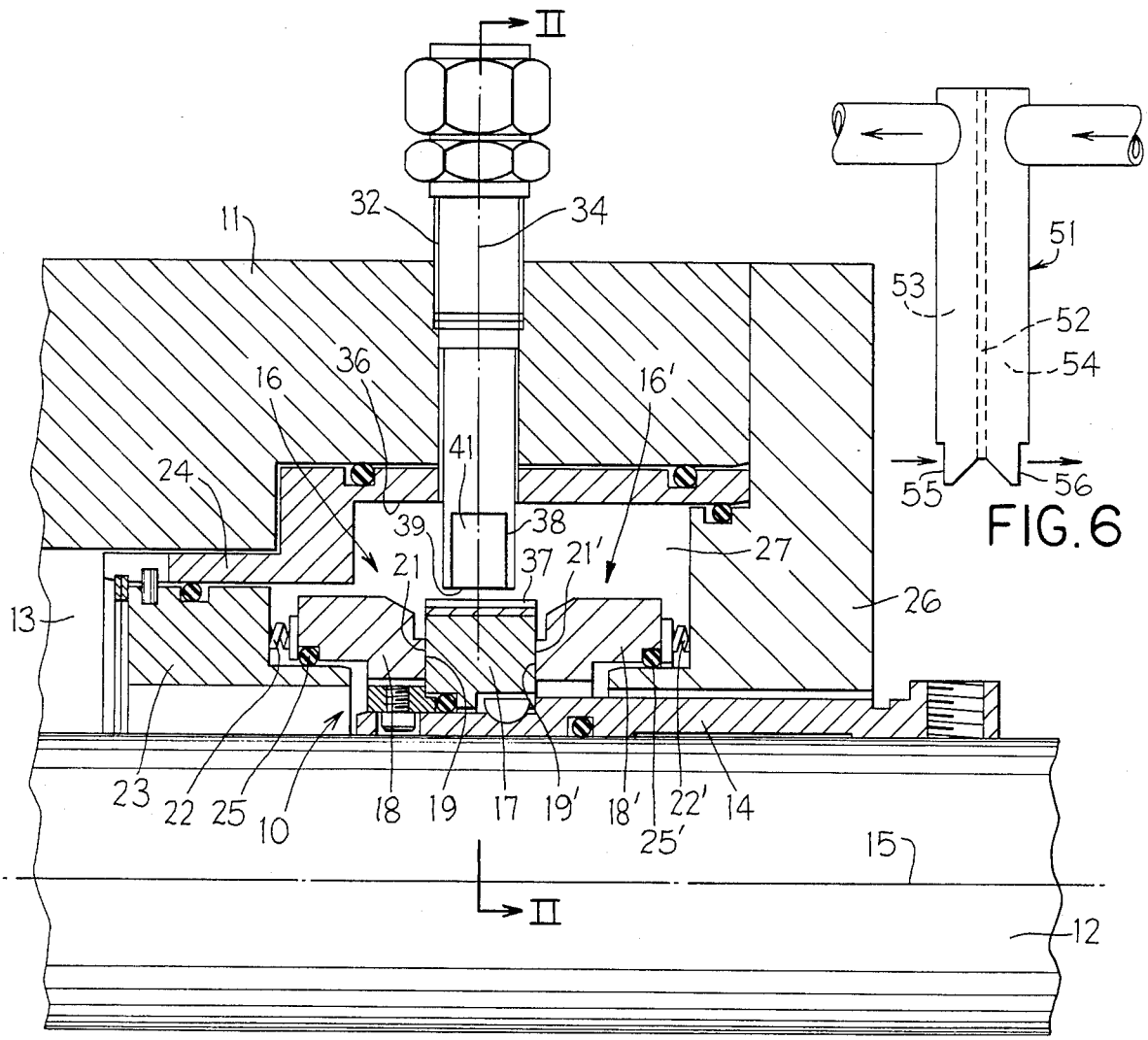
FIG. 1
FIG. 6
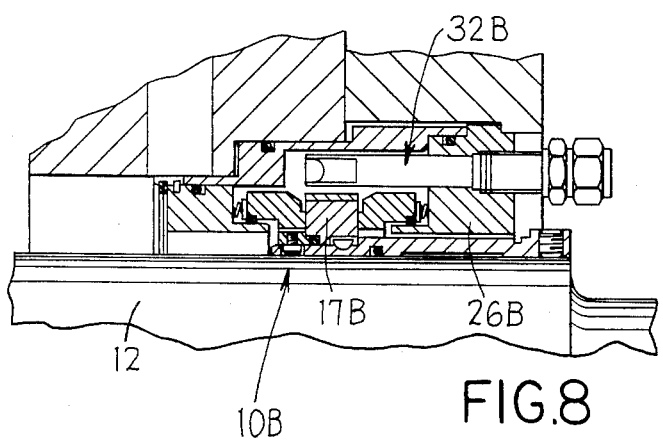
FIG. 8
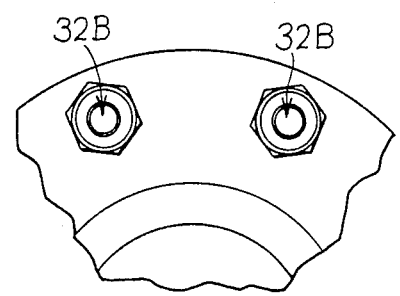
FIG. 9

MECHANICAL SEAL ASSEMBLY WITH COOLANT CIRCULATION TUBE

This application is a continuation of U.S. Ser. No. 928,506, filed Nov. 7, 1986, now abandoned.

FIELD OF THE INVENTION

This invention relates to a mechanical seal construction having an improved coolant circulation structure associated therewith, whereby cooling of the seal construction is optimized without requiring auxiliary pumping equipment.

BACKGROUND OF THE INVENTION

Mechanical seal assemblies generate a significant amount of heat, and a liquid coolant is typically circulated through the seal cavity of the assembly to remove the seal-generated heat. This coolant is typically circulated through an external circuit having a heat exchanger associated therewith to effect removal of the heat from the coolant. When dealing with a conventional single mechanical seal assembly, the coolant is typically provided by continuously bypassing part of the pump fluid through the seal cavity inasmuch as the cooling demands are generally of less severity, although in some instances a wholly separate coolant is required. When dealing with double mechanical seals, however, the seal-generated heat is typically a much more severe problem, and the pressure within the seal cavity is normally significantly different from the pressure of the pumped fluid, whereby the coolant for a double seal is usually different from the pumped fluid. Further, with ever-increasing operational demands and expectations, and specifically higher rotational speeds, the heat generated by such mechanical seals increases significantly, and thus the cooling demands for mechanical seals have and continue to present a formidable problem.

In view of the above, it has been generally recognized that coolant circulating devices are needed to ensure that the coolant can be properly supplied to and through the seal cavity to effect desired cooling of the mechanical seal and thus ensure control over the temperature thereof. At present, mechanical seal manufacturers typically utilize four different types of devices to effect circulation of coolant within a substantially closed loop (which includes the seal cavity) in an attempt to cool the mechanical seal assembly.

One of the most common and still extensively utilized types of fluid circulating devices consists of an external pump, a reservoir, a pressure regulator, a heat exchanger, pertinent piping and associated gauging and valving. The piping defines a closed loop which connects to and includes the seal cavity, and the external pump forcibly pressurizes and drives the coolant in a circulatory manner around the closed loop. This type of coolant circulating device, however, is obviously structurally and operationally complex, requires an unnecessary and undesirable amount of space, and is costly to install and maintain.

In view of the obvious disadvantages associated with the above type of coolant circulating device, manufacturers have obviously sought less costly and simpler devices, and three such devices have been developed in an attempt to facilitate circulation of coolant, particularly in conjunction with a double seal. These latter three devices are known in the industry as a pumping ring, a cut vane and a pumping screw.

As to a pumping ring, it consists of a serrated ring or similar device attached to the pump shaft for rotation therewith. A fluid exit hole is located through the housing so as to project over the pumping ring, which hole exits either radially or tangentially from the seal cavity. With this type device, the centrifugal force generated by the pumping ring is used to throw the coolant outwardly through the exit hole and thus pump the coolant through the closed loop without requiring external pumps or the like. This type arrangement, however, provides proper cooling only under very limited operational conditions inasmuch as the flow rate of the coolant with this type device is small in relationship to the pressure within the seal cavity, and hence this device has limited capability for extracting seal-generated heat. U.S. Pat. No. 4,466,619, as owned by the assignee of this application, illustrates one type of fluid circulating device employing a pumping ring.

To improve upon the operation or performance of the pumping ring, there has also been developed a cut vane for effecting fluid circulation of the coolant. The cut vane also typically uses a serrated ring like the pumping ring to spin or circulate the fluid within the seal cavity. A stationary housing ring typically closely surrounds the pumping ring. This housing ring defines therein an enlarged channel or space which extends around the pumping ring from an inlet hole to an exit hole, with the region extending from the exit hole to the inlet hole (in the flow direction) being generally closed by a structure which is referred to as the "cut vane". This type device functions by using both the centrifugal force generated by the pumping ring and the velocity head developed as a result of the coolant's peripheral speed. Due to the provision of the cut vane between the exit and inlet holes, the circulating fluid within the enlarged channel is given a significant velocity prior to its striking the cut vane adjacent the exit hole, which cut vane then forces the fluid out the exit hole so that it circulates through a closed loop, passes through a heat exchanger, and is thence resupplied through the inlet hole. With this cut vane fluid circulating device, satisfactory cooling of a mechanical seal can generally be achieved only under limited operating conditions since the rate of coolant flow is relatively small in relationship to the coolant pressure developed within the seal cavity. U.S. Pat. No. 4,560,173, owned by the assignee of this application, illustrates a cut vane in conjunction with a mechanical seal.

The other type of fluid circulating device which has been rather extensively used is a pumping screw. With this arrangement, an elongated pumping sleeve is fixedly and concentrically secured within the rotor in surrounding relationship to the rotatable shaft. The pumping sleeve typically has a spiral pumping groove formed in the periphery thereof so as to screw or "auger" coolant axially along the shaft. With this arrangement, however, the spiral pumping groove and its small cross section creates a severe restriction on the quantity of fluid which can be pumped or recirculated, and hence the effectiveness of this arrangement is seriously questionable. Further, the pumping sleeve occupies substantial space both axially and radially, whereby the overall seal construction oftentimes becomes of undesirably great size, whereby the space and excessive cost of this type arrangement is undesirable. Still further, the effectiveness of this device is wholly dependent on the viscous friction between the spinning screw and the stationary housing, and experience indicates that the performance of this device increases only as the viscous drag increases. This type device works most efficiently with thicker or more viscous fluids, or by increasing the drag at the stationary wall, the latter being accomplished by machining an internal screw thread into the stationary bore in such manner as to be counter to the rotating thread. Such arrangement is also obviously complex and costly. Such pumping screws hence are most efficient only when working with high viscosity fluids, and have only minimal effectiveness when working with low viscosity fluids. Since most mechanical seal assemblies involve low viscosity fluids, the pumping screw has little or only minimal effectiveness in a great majority of use applications.

Accordingly, it is an object of this invention to provide an improved fluid circulating device used in conjunction with a mechanical seal, and particularly for use when handling low viscosity fluids, for permitting effective dissipation of seal-generated heat by effecting improved circulation and specifically rate of flow of coolant within a substantially closed circuit.

According to the present invention, the mechanical seal assembly can be provided with a seal cavity which is significantly larger than the rotating seal parts, thereby providing a diametral clearance around the seal parts which is of significantly greater extent than can typically be utilized, which clearance functions as a chamber in which a substantial quantity of coolant can be circulated around the seal parts. A coolant circulation tube (i.e., an exit tube) projects through the housing into the seal cavity and is provided with a window-shaped opening in the sidewall thereof opposing the direction of coolant circulation. The lower end of the tube is preferably closed off by a bottom wall which is inclined outwardly away from the rotating seal parts in the direction of fluid circulation, and this bottom wall has its lower free edge defining not only the lower edge of the window but also disposed closely adjacent the periphery of the rotating seal parts. The substantial quantity of circulating or spinning coolant, and the substantial velocity head thereof, passes through the window into the inner end of the tube so that the velocity head is converted into a significant static pressure head, whereupon the liquid is confined and is effectively pumped or forced radially outwardly of the tube through a closed circuit having a heat exchanger associated therewith. This circuit at its other end connects to an inlet hole (such as another tube if desired) which communicates with the seal cavity at a location which is circumferentially spaced slightly downstream from the exit tube. The exit tube enables a much greater mass of coolant to be spun around the seal parts by virtue of the larger radial space required as compared to an axial pumping screw and causes a greater mass of coolant to be circulated through the coolant system, thereby permitting creation of a significantly greater flow rate of coolant in relationship to the pressure created within the seal cavity.

Other objects and purposes of the invention will be apparent to persons familiar with structures of this general type upon reading the following specification and inspecting the accompanying drawings.

BRIEF DESCRIPTION OF THE DRAWINGS

FIG. 1 is a fragmentary sectional view illustrating a double mechanical seal in conjunction with the improved coolant circulation tube of the present invention.

FIG. 6 illustrates a variation of the tube.

FIG. 8 is a fragmentary sectional view of a third embodiment showing an alternate orientation of the tube.

FIG. 9 is a fragmentary end view of FIG. 8.

Figure 2:
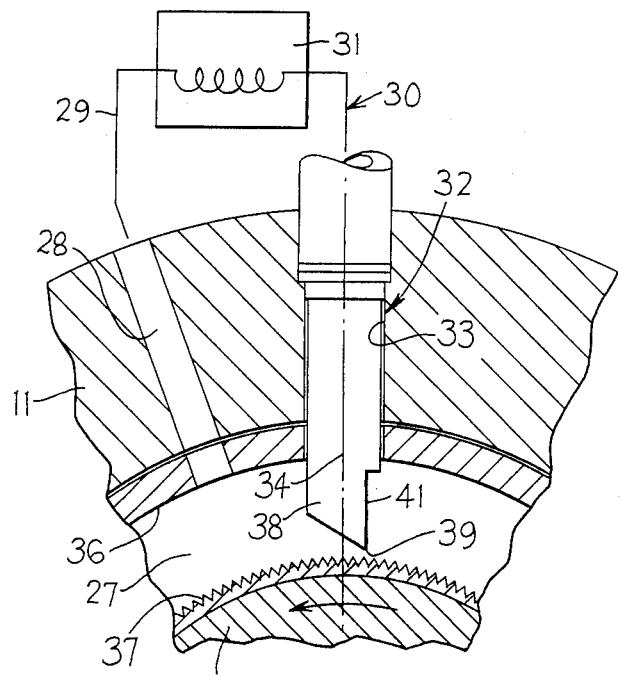
FIG. 2 is a fragmentary sectional view taken substantially along line II—II in FIG. 1.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

FIGS. 1 and 2 illustrate a mechanical seal construction 10, specifically a double seal, which is of conventional construction and cooperation. This mechanical seal construction 10 cooperates between a stationary housing 11 and a rotatable shaft 12, the latter projecting outwardly through a cylindrical opening 13 (commonly referred to as a stuffing box) which projects outwardly of the housing. The shaft 12, in the illustrated embodiment, has a concentric shaft sleeve 14 disposed thereon and nonrotatably secured thereto, although it will be recognized that the shaft sleeve is for convenience in mounting the seal construction since the shaft sleeve can be eliminated if desired. The shaft 12 is rotatable about its longitudinally extending axis 15 and, at its inner or leftward end in FIG. 1, conventionally mounts thereon a fluid handling element such as a pumping impeller or the like (not shown).

The double seal construction 10, as shown by FIG. 1, has inner and outer seal units 16 and 16', respectively, each creating a seal between the stationary housing 11 and the rotatable shaft 12 so as to sealingly isolate the interior of the stuffing box 13 from the surrounding environment. These inner and outer seal units 16 and 16' both cooperate with and include, as a part thereof, a rotating seal ring or rotor 17 which concentrically surrounds and is nonrotatably secured to the shaft sleeve 14.

The inner seal unit 16 has a nonrotatable seal ring or stator 18 which concentrically surrounds the shaft 12 and has a flat annular seal face 19 formed on one axial end thereof, which seal face 19 abuttingly contacts an opposed axial seal face 21 formed on the adjacent end of the rotor 17. The stator 18 is resiliently urged against the rotor by springs 22 which axially coact between the stator 18 and a nonrotatable support ring 23. This latter ring 23 is sealingly and non-rotatably secured to and within a sleeve liner 24, the latter being disposed within the stuffing box 13 and non-rotatably and sealingly cooperating with the surrounding inner wall of the housing 11. An elastomeric O-ring 25 coacts between the stator 18 and an axially projecting sleeve part of the support ring 23 to create a sealed relationship therebetween, and at the same time permit the stator 18 to undergo limited floating or tilting movement relative to the support ring 23 so as to maintain the opposed seal faces 19 and 21 in proper seating but relatively rotatable engagement with one another. The collar 18 is non-rotatably coupled to the support ring 23 in a conventional manner, such as by pins (not shown) which are fixed to the support ring and project axially therefrom into drive slots or recesses formed in the adjacent axial end of the collar 18.

The outer seal unit 16' is of similar construction in that its stator 18' again has an axial end face 19' which is resiliently urged into abutting engagement with an opposed seal face 21' formed on the other axial end face of the rotor 17. The stator 18' is urged toward the rotor by springs 22' which coact between the stator 18' and a stationary gland ring 26, the latter being secured to the housing 11 in a conventional manner, such as by screws (not shown). The stator 18' is sealingly and non-rotatably supported by the gland ring 26, such as through drive pins (not shown) projecting axially therebetween, while at the same time the stator 18' is supported by the elastomeric O-ring 25' and can undergo limited radial floating or tilting movement so as to maintain the opposed seal faces 19' and 21' in proper opposed engagement with one another.

The disposition of the seal construction within the stuffing box 13, and its cooperation between the housing and shaft as explained above, results in the creation of an annular chamber or cavity 27 within the housing in surrounding relation to the seal rotor 17' and stators 18 and 18'.

The structure of the double seal construction 10, as described above, is conventional so that further detailed description thereof is believed unnecessary.

To control the temperature of the mechanical seal, and more specifically remove excessive heat which is generated thereby, there is provided a coolant system 30 for effecting circulation of coolant through the cavity 27. This coolant system 30 includes an inlet opening or passage 28 which projects through the housing for communication with the cavity 27. This inlet opening 28, at its outer end, communicates with a piping circuit 29 which has a conventional heat exchanger 31 associated therewith. This circuit 29 also communicates with a coolant circulation tube 32 which is mounted on and projects through the housing 11 for communication with the cavity 27. This tube 32 in effect defines an exit or outlet passage for the coolant from the cavity 27. With this double seal construction 10, the exit tube 32 and the inlet passage 28 are normally disposed with their centerlines within substantially the same radial plane (that is, a plane which perpendicularly intersects the rotational axis 15), but the outlet tube 32 is angularly spaced upstream (relative to the direction of seal rotation) from the inlet opening 28 by a small angular extent, such as by an angle of about 20°.

The coolant system 30 is free of external pumping devices and the like, whereby a liquid coolant is supplied through inlet opening 28 into the cavity 27, whereupon the coolant circulates around the cavity 27 in the direction of rotation (counterclockwise in FIG. 2), then exits through the tube 32 into the circuit 29 so as to pass through and be cooled within the heat exchanger 31, whereupon the cooled coolant is then resupplied through inlet opening 28 into the cavity 27.

Considering now the structure of the tube 32 in greater detail, this tube has a substantially cylindrical opening 33 extending longitudinally thereof, the latter defining the exit opening or passage for the coolant. The tube 32 is disposed with its longitudinally extending centerline 34 projecting substantially radially outwardly from and in intersecting relationship with the shaft axis 15. The tube 32 is also disposed so that its centerline 34 radially intersects the rotor 17, the centerline 34 preferably being disposed so as to be substantially within the central plane (i.e., substantially midway between the faces 21 and 21') of the rotor.

The tube 32, at its radially inner end, terminates in an axially elongated tubular tip part 38 which projects into the annular cavity 27 between the surrounding inner wall 36 of the housing liner and the exterior annular wall 37 of the rotor. In fact, this tip part 38 projects radially across this cavity 27 such that the radially inner free end or tip 39 thereof is disposed closely adjacent the outer wall 37 of the rotor. The radial spacing between the outer wall 37 and the tip 39 is normally maintained at a minimal amount which is just sufficient to avoid physical contact therebetween, which radial clearance will normally be about 0.050 inch.

Figure 3:
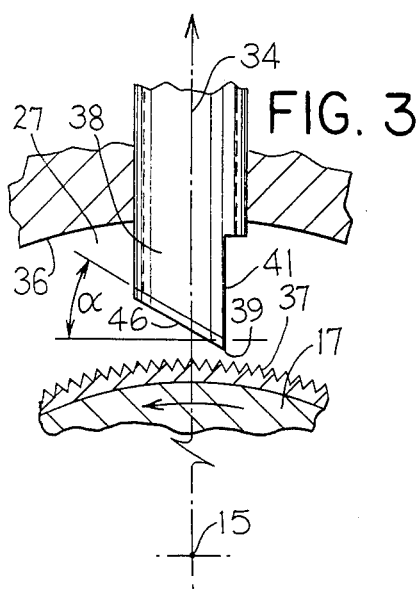
FIG. 3 is an enlarged fragmentary view showing the tip end of the discharge tube as it projects into the seal cavity.
Figure 4:
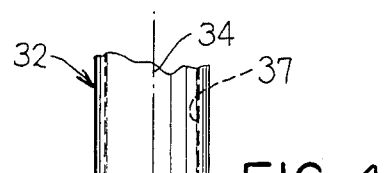
FIG. 4 is a side view of the tube tip end as shown in FIG. 3.
Figure 5:
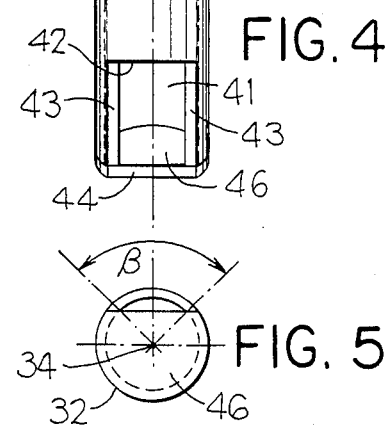
FIG. 5 is a bottom view of the tube as shown in FIG. 4.

The tip part 38, as illustrated by FIGS. 3–5, has a windowlike opening 41 formed through the sidewall thereof directly adjacent the free inner end of the tube. This windowlike opening 41 is of a generally rectangular configuration in that it is defined by an upper edge 42 which is disposed close to but generally spaced slightly inwardly from the wall 36. The upper edge 42 extends between a pair of downwardly projecting and substantially parallel side edges 43, the latter being joined by a bottom edge 44. This bottom edge 44 in effect defines the tip end 39 of the tube.

The inner end of the tube 32 is closed by a bottom wall 46, whereby the only access into the passage 37 is through the sidewardly-directed opening or window 41. The bottom wall 46 is disposed in an angled or sloped relationship in that it slopes upwardly at an angle $\alpha$ (FIG. 3) relative to a plane perpendicular to the centerline 34. Thus, the inside or upper surface of this bottom wall 46 in effect functions as an impact wall which is sloped radially outwardly as it projects in the flow direction so as to assist in deflecting the coolant radially outwardly through the discharge passage 37. This angle $\alpha$ is preferably in the range of between about 30° and 45°.

The flow tube 32 is oriented such that the window 41 faces in the upstream direction of the coolant flow within the cavity 27, substantially as illustrated by FIG. 3.

In addition, the window 41 extends angularly around the sidewall of the tube 32 through a selected angle $\beta$ (FIG. 5) as measured relative to the centerline 34. This angle $\beta$, which is centered about and extends equally on opposite sides of a plane which contains the centerline 34 and perpendicularly intersects the rotational axis 15, is significantly less than 180°. In fact, the angle $\beta$, which determines the width of the window, is preferably about 78°, plus or minus about 5°. This width of the window 41, as measured by the angle $\beta$, takes advantage of the static pressure distribution which is developed along the sidewall of a cylinder as a result of flow therearound. This window angle $\beta$ effectively corresponding to the angle of the sidewall on which the static pressure is exerted, whereupon forming the window 41 of this angle thus takes advantage of this pressure and permits it to be converted to a velocity-form of energy so as to greatly enhance and maximize the quantity of coolant which can be effectively circulated through the cooling system, including both through the external piping and through the cavity. Further, the flow tube 32 and the configuration of its tip part 38 permits the radial spacing between the opposed surrounding walls 36 and 37 to be significantly increased in relationship to conventional practice, such as by providing a radial spacing between walls 36 and 37 which can approach up to one inch. The window 41 itself has a height, as measured by the side edges 43, which also closely approximates the full height or radial spacing between the walls 36 and 37. This hence maximizes the amount of coolant which can be supplied into the cavity 27 so as to permit maximum heat dissipation from the seal construction, and at the same time maximizes the quantity of coolant which can be readily externally circulated by being diverted outwardly through the tube 32 so as to be resupplied through the heat exchanger.

If the angle $\beta$ defining the width of the window 41 deviates significantly from the desired value noted, then it has been observed that the quantity of coolant (i.e., gallons per unit time) which can be circulated under otherwise identical conditions is significantly decreased, and this in turn significantly decreases the cooling efficiency and hence the heat-extracting capability of the arrangement.

The outer annular wall 37 of the rotor 17 is preferably roughened to assist in effecting circulation of coolant around the cavity 27. For example, wall 37 is preferably provided with a toothed, specifically a knurled, surface so as to effectively act like a pumping ring.

While FIGS. 1 and 2 illustrate the mechanical seal being provided with a conventional inlet passage 28, nevertheless the inlet passage 28 and tube 32 of FIGS. 1 and 2 could be replaced with a combined inlet/outlet tube 51 as illustrated by FIG. 6. The tube 51 is of larger diameter than the tube 32 and has a central dividing wall or partition 52 extending diametrically thereacross so that the interior of the tube is divided into a pair of passages 53 and 54, which passages function as the exit and inlet passages respectively in the illustrated embodiment. The lower end of the tube has a pair of oppositely facing windows 55 and 56 which are formed identically to the window 41. The window 55 and the outlet passage 53 hence cooperate in the same manner as the tube 32 described above, whereas the other passage 54 merely functions as a convenient inlet. With this arrangement of the tube 51, however, the two passages 53-54 and the respective windows 55-56 are identical and the windows face in opposite directions, so that the tube is bidirectional in that it can be made to successfully operate irrespective of the direction of seal rotation. The passage 53 will function as the outlet when the seal rotates in one direction, whereas the other passage 54 will function as the outlet when the rotation is in the opposite direction.

Figure 7:
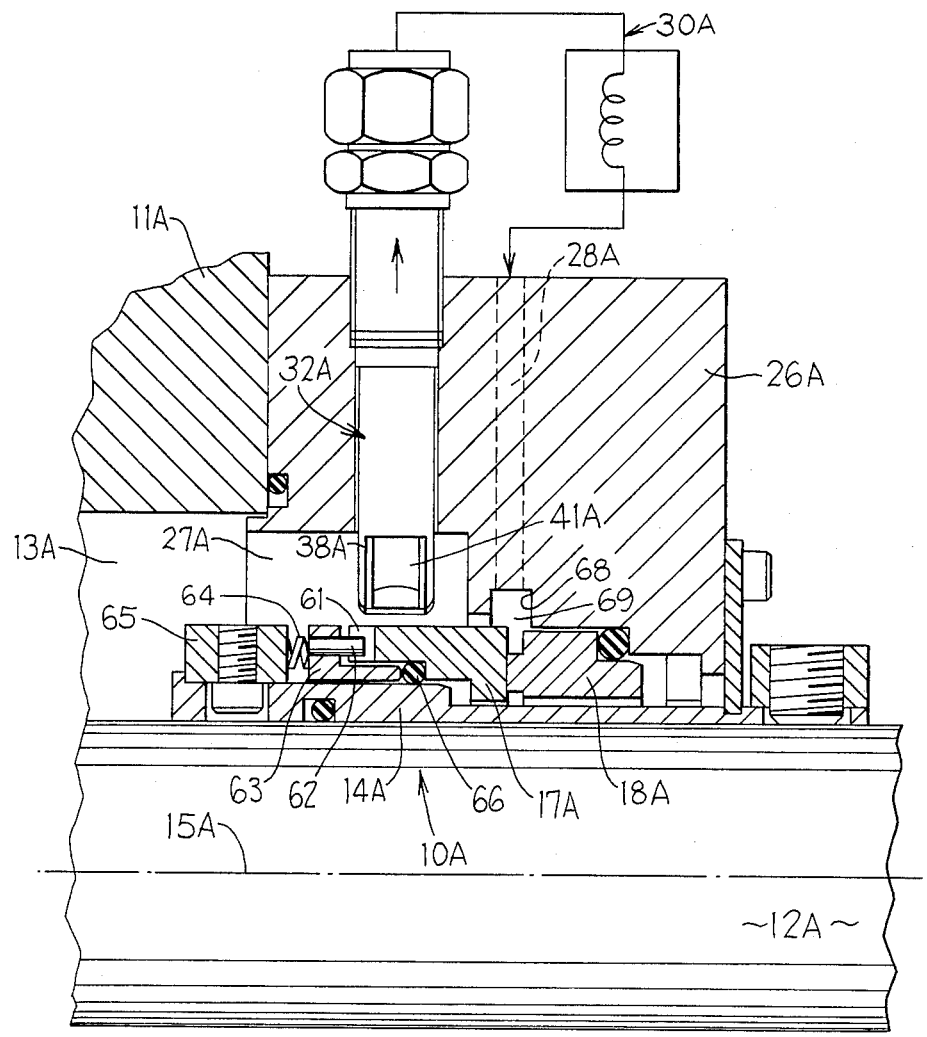
FIG. 7 shows a second embodiment wherein there is illustrated a fragmentary sectional view of a single mechanical seal having the improved flow circulation tube associated therewith.

FIG. 7 illustrates a variation wherein there is illustrated a single mechanical seal construction 10A. FIG. 7 utilizes the same reference numerals to designate the corresponding parts of FIGS. 1-2 but with the addition of an "A" thereto.

This single seal construction 10A has the stator 18A nonrotatably interconnected relative to the gland ring 26A. The stator 18A has a seal face thereon which axially abuts an opposed seal face formed on the axial end of the rotor 17A. The rotor 17A is nonrotatably coupled to a drive sleeve 63 which is axially slidably but nonrotatably mounted on the shaft sleeve 14A. This drive sleeve 63 has pins 62 projecting axially therefrom into notches 61 formed in the rotor 17A for effecting a nonrotatable and hence driving connection therebetween. The drive sleeve 63 is urged by springs 64 axially toward the rotor 17A, with a suitable elastomeric seal ring 66 coacting therebetween. The springs 64 react against a collar 65 which is stationarily secured to the shaft sleeve 14A.

The construction of the single seal 10A, as briefly described above, is conventional and well known.

To effect circulation of coolant within the cavity 27A, which cavity opens into and is part of the stuffing box 13A, the gland ring 26A again has a flow tube 32A mounted thereon and projecting radially therethrough so as to form part of the coolant system 30A. The tube 32A is identical to the tube 32 described above. In this instance, however, the tip end of the tube does not project directly over the rotor 17A in close proximity to the seal faces, but rather is positioned axially adjacent the opposite end of the rotor, that is in the vicinity of the slots 61. By positioning the tip end 38A and hence the window 41A close to and at least partially radially aligned with the slots 61, the rear walls of the slot 61 effectively act as pumping elements or blades which assist in imparting significant circulation to the coolant flowing around the cavity 27A, and in turn effect a driving of this fluid into the window 41A and thence upwardly and outwardly through the tube 32A so as to be circulated through the external piping.

In this variation, the inlet passage 28A, in addition to being slightly circumferentially angularly spaced from the tube 32A, is also preferably slightly axially spaced therefrom so that the inlet passage 28A communicates radially with an enlarged undercut channel 68 which is formed in the gland ring 26A in direct surrounding relationship to the sliding interface between the opposed seal faces. This undercut groove 68 defines an enlarged annular chamber 69 into which the coolant is resupplied to the seal cavity, with the resupplied coolant, being at its lowest temperature, being deposited directly into this undercut channel 68 in direct surrounding relationship to and hence in close proximity to the seal faces.

Considering now FIGS. 8 and 9, there is illustrated a further variation which again employs a double mechanical seal construction 10B. In this variation, the flow tube 32B projects axially inwardly through an opening provided in the end or gland ring 26B so that the centerline or axis of the flow tube 32B extends generally parallel with the rotational axis of the shaft 12. The flow tube 32B has the tip end thereof positioned closely adjacent and substantially directly over the exterior circumferential surface of the rotor 17B.

If desired, two such identical flow tubes 32B can be provided as illustrated in FIG. 9, one functioning as an inlet and the other as an outlet, whereby the two flow tubes are disposed so that the windows in the tip ends thereof face circumferentially in opposite directions, that is, one window faces in an upstream direction and the other faces in a downstream direction. Such an arrangement is bidirectional since either tube can function as the inlet or the outlet, depending upon the direction of seal rotation.

When using the improved flow tube of the present invention, experimental testing has indicated a significant improvement in the performance of the cooling system over conventional devices at a significantly reduced cost. In particular, it has been observed that the improved arrangement is highly desirable when dealing with low viscosity fluids since experimental evaluations indicate that a significant increase in flow rate can be achieved in relationship to pressure.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mechanical seal construction for creating a sealed relationship between a housing and a rotatable shaft, said seal construction including a seal rotor disposed within a cavity in the housing in surrounding relationship to the shaft and being sealingly and nonrotatably coupled thereto, the seal rotor defining a pair of first annular and axially directed rotatable seal faces formed on opposite axial ends thereof, and a pair of seal stators disposed in surrounding relationship to said shaft and nonrotatably and sealingly secured relative to said housing, said pair of seal stators being axially spaced apart and disposed in axially straddling relationship to said seal rotor, each said seal stator defining thereon a second annular and axially directed nonrotatable seal face formed thereon and maintained in sliding sealing engagement with an opposed one of said first seal faces, an annular chamber for coolant defined radially between said housing and said rotor and axially between said pair of stators, and a closed circulation system including said annular chamber for recirculating coolant therethrough to effect cooling of said seal faces, said circulation system including inlet and outlet openings communicating with said annular chamber at circumferentially spaced locations, and closed piping means disposed externally and connected between said inlet and outlet openings for defining a closed system permitting coolant to be recirculated from said outlet back to said inlet, the improvement comprising:

said exit opening being defined by a flow tube which projects radially through said housing and defines an outlet passage for coolant therethrough, said flow tube terminating at its radially inner end in a tubular tip part which projects radially into said annular chamber, said tubular tip part terminating in a free end which is positioned closely adjacent a circumferential exterior wall of said rotor, said tubular tip part having a windowlike opening formed in a sidewall thereof, said opening having a height as measured in said radial direction which extends over a majority of the radial height of said annular chamber, and said windowlike opening having a width as measured circumferentially of said flow tube which extends transversely through a distance which is a majority of but less than the maximum transverse cross-sectional dimension of the outlet passage, said windowlike opening in a circumferential direction which is opposite to the direction of rotation of said seal rotor.

2. A seal construction according to claim 1, wherein said tube is of a cylindrical configuration in cross section, and wherein said windowlike opening extends through an angle relative to the centerline of said tube of about 78° plus or minus about 5°.

3. A seal construction according to claim 1, wherein said flow tube has a cylindrical cross-sectional configuration, wherein said windowlike opening has a width defined by a circumferentially extending angle which is generated about the centerline of the tube and is significantly less than 180°.

4. A seal construction according to claim 3, wherein the radially inner end of said flow tube is closed by an end plate which extends from the radially inner end of said windowlike opening and is sloped outwardly as it projects radially across said tube, said end plate having an inner surface thereon which is aligned circumferentially directly behind said windowlike opening and acts as an impact surface for deflecting coolant entering the window radially outwardly into and through the outlet passage.

5. A seal construction according to claim 4, wherein said windowlike opening extends through an angle as defined about said centerline of about 78° plus or minus about 5°.

6. A seal construction according to claim 5, wherein the circumferential exterior wall of said seal rotor is roughened to effect pumping and circulating of the coolant within said annular chamber.

7. In a mechanical seal construction for creating a sealed relationship between a housing structure and a rotatable shaft structure, said seal construction including a seal rotor means disposed within a cavity in the housing structure in surrounding relationship to the shaft structure and being sealingly and nonrotatably coupled thereto, and a stator means disposed in surrounding relationship to said shaft structure and nonrotatably and sealingly secured relative to said housing structure, said rotor and stator means having opposed annular and axially directed seal faces which are disposed in sliding and sealing engagement with one another, and a closed circulation system for recirculating liquid coolant to effect cooling of said seal faces, said system including a substantially annular coolant region formed interiorly of said housing structure in surrounding relationship to said rotor means, first and second openings extending through said housing structure for communication with said annular region at circumferentially spaced locations, and external conduit means connected between the outer ends of said first and second openings for defining a closed circuit for liquid coolant, said external conduct means being free of external pumping devices, one of said first and second openings functioning as an outlet for discharging coolant from said annular region and the other of said first and second openings functioning as an inlet for supplying coolant into said annular chamber, the improvement comprising:

a flow tube of substantially cylindrical cross-sectional construction mounted on and projecting through said housing structure, said flow tube defining said one opening therethrough for permitting discharge of coolant from said annular chamber, said flow tube having at the inner end thereof an axially elongated tubular tip part which is disposed in its entirety within said annular region, said tubular tip part having a windowlike opening formed in the tubular sidewall thereof, said opening facing circumferentially in a direction which is opposite to the direction of rotation of said rotor means, said windowlike opening extending circumferentially of said tube through an angle which is less than 90° as defined about the centerline of said tube.

8. A seal construction according to claim 7, wherein said tube projects through said housing along a direction which is substantially radially oriented relative to the rotational axis of said shaft structure.

9. A seal construction according to claim 7, wherein said windowlike opening extends circumferentially of said tube through an angle of about 78°, plus or minus about 5°.

10. A seal construction according to claim 7, wherein the seal rotor means has an exterior annular surface which is roughened to effect circulation of the coolant within the annular region, and wherein the tip part has at least a wall thereof positioned closely adjacent said exterior annular wall.

11. A seal construction according to claim 7, wherein said other opening is defined by a second tube which is substantially identical to said first-mentioned tube, the windowlike openings of said first-mentioned and second tubes being circumferentially oriented in opposite directions so that either said tube can function as the inlet and the other said tube can function as the outlet so as to permit rotation of the seal rotor means in either direction.

12. A seal construction according to claim 7, wherein said tube has a bottom plate secured to and closing off the inner free end thereof, said bottom plate defining one edge of said windowlike opening, said plate extending at an angle in the range of between about 30° and about 45° relative to a plane which is perpendicular to the longitudinally extending centerline of said tube, said plate being inclined in a direction whereby it slopes upwardly behind said windowlike opening to assist in deflecting coolant outwardly along the tube as the coolant flows into the tube through the windowlike opening.

* * * * *